United States Patent Office 3,479,314
Patented Nov. 18, 1969

3,479,314
OXYMETHYLENE POLYMER COMPOSITION AND
FIBER PRODUCED THEREFROM
Albert G. Williams, West Orange, N.J., assignor to
Celanese Corporation, New York, N.Y., a corporation of Delaware
No Drawing. Original application July 22, 1960, Ser. No. 44,543. Divided and this application Dec. 7, 1965, Ser. No. 528,666
Int. Cl. C08g 43/00, 51/52, 51/34
U.S. Cl. 260—30.4                          2 Claims

ABSTRACT OF THE DISCLOSURE

A polymer composition and high tenacity fibers formed therefrom, which composition comprises an oxymethylene polymer containing up to 50 weight percent of a material which is miscible with a melt of the polymer and which reduces the viscosity of the melt.

---

This application is a divisional application of Ser. No. 44,543, filed July 22, 1960.

This invention relates to the spinning of fibers and more particularly to the melt spinning of fibers from oxymethylene polymers.

Oxymethylene polymers, having successively recurring —$CH_2O$— units have been known for many years. They may be prepared by the polymerization of anhydrous formaldehyde or by the polymerization of trioxane which is a cyclic trimer of formaldehyde.

High molecular weight oxymethylene polymers may be prepared in high yields and at rapid reaction rates by the use of acetic boron fluoride-containing catalysts such as boron fluoride itself, and boron fluoride coordinate complexes with organic compounds in which oxygen or sulfur is the donor atom, as described in applications Ser. Nos. 691,144 and 691,143 both filed Oct. 21, 1957 by Hudgin and Berardinelli, now U.S. Patents 2,989,507 and 2,989,506 respectively and incorporated herein by reference.

Oxymethylene polymers of improved thermal stability have been prepared by copolymerizing trioxane with from 0.5 to 25 mol percent of a cyclic ether having adjacent carbon atoms. Copolymers of this type are described in application Ser. No. 718,148, filed Feb. 28, 1958 by Walling, Brown and Bartz, now abandoned and incorporated herein by reference. The preferred copolymers are those made up of oxymethylene and oxyethylene groups, such as copolymers of trioxane with dioxolane or with ethylene oxide.

Among the oxymethylene polymers which may be used in this invention are oxymethylene homopolymers, with stabilizing end groups if desired, and oxymethylene copolymers, particularly those having a recurring structure comprising recurring units having the formula

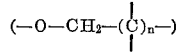

wherein $n$ is an integer from zero to 5 and wherein $n$ is zero in from 75 to 99.5 percent of the recurring units.

A preferred class of copolymers are those having a structure comprising recurring units having the formula (—O—$CH_2$—($CH_2$)$_n$—) wherein $n$ is an integer from zero to 2 and wherein $n$ is zero in from 75 to 99.5 percent of the recurring units. These copolymers are prepared by copolymerizing trioxane with a cyclic ether having the structure

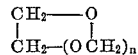

where $n$ is an integer from zero to two.

Among the specific cyclic ethers which may be used are ethylene oxide, 1,3-dioxolane, 1,3,5-trioxepane, 1,3-dioxane, trimethylene oxide, pentamethylene oxide, 1,2-propylene oxide, 1,2-butylene oxide, neopentyl formal, pentaerythritol diformal, paraldehyde, tetrahydrofuran, and butadiene monoxide.

It has now been found that fibers of high tenacity and modulus may be prepared by extruding through a spinning orifice a molten mixture comprising an oxymethylene polymer and up to 50 weight percent of a material which is miscible with a melt of said polymer and which reduces the viscosity of such a melt. Preferably, the material is one which is miscible with said polymer at its natural melting temperature to form single phase liquid mixtures containing at least 10 weight percent of said material and which at said 10 weight percent level and at said melting temperature reduces the absolute viscosity of the liquid polymer by at least 20%.

Among the suitable materials which may be used are formamides, such as formamide, itself, N,N-dimethyl formamide and N-methyl-N-phenyl formamide; phenols, such as phenol, itself, m-cresol, m-chlorophenol, p-chlorophenol, 3,4-xylenol, o-cyclohexyl phenol and alpha naphthol; halogen-substituted aliphatic hydrocarbons, such as symmetrical tetrachloroethane and ethylene bromide; lactones, such as gamma butyrolactone; aromatic amines, such as aniline and O-toluidine and aryl phosphates, such as tricresyl phosphate and trixylenyl phosphate.

The polymer and the viscosity reducing material may be blended in liquid phase after the polymer has been melted. But it is preferred to blend the materials while the polymer is in a semi-solid state as a plastic mass. The materials may be blended, for example, while being worked on a two roll rolling mill or in a blending extruder.

The preferred proportion of viscosity reducing material in the blend to be melt spun is between about 1 and 40 percent based on the weight of the resin. Where the viscosity reducing material is a relatively volatile material, such as dimethyl formamide, a higher proportion, such as between about 3 and 50 percent based on the weight of the resin, must be charged to the blending operation to produce a final blend in the proportions desired, unless precautions, such as the use of super-atmospheric pressure, are taken to reduce the volatilization of the agent during blending.

It is generally desirable to incorporate one or more thermal stabilizers into the copolymer in order to enhance its thermal stability.

The proportion of stabilizer incorporated depends upon the specific stabilizer used. A proportion between about 0.05 and 10 weight percent (based on the weight of polymer) has been found to be suitable for most stabilizers.

The stabilizers are generally incorporated into the resin prior to the blending thereof with the viscosity reducing material. If desired, however, all or a portion of the stabilizer may be incorporated during or after the blending of the resin with the viscosity reducing material.

One suitable stabilizer system is a combination of an anti-oxidant ingredient such as phenolic antioxidant and most suitably a substituted bisphenol, and an ingredient to inhibit chain scission, generally a compound or a polymer containing trivalent nitrogen atoms.

A suitable class of alkylene bisphenols includes compounds having from 1 to 4 carbon atoms in the alkylene group and having from zero to 2 alkyl substituents on each benzene ring, each alkyl substituent having from 1 to 4 carbon atoms. The preferred alkylene bisphenols are 2,2'-methylene bis-(5-methyl-6-tertiary butyl phenol) and 4,4'-butylidene bis-(6-tertiary butyl - 3 - methyl phenol). Suitable phenolic stabilizers other than alkylene bis-phenols include 2,6-ditertiary butyl-4-methyl phenol, octyl phenol and p-phenyl phenol.

Suitable phenolic stabilizers other than alkylene bisphenols include 2,6-ditertiary butyl-4-methyl phenol, octyl phenol and p-phenyl phenol.

Suitable scission inhibitors include carboxylic polyamides, polyurethanes, substituted polyacrylamides, polyvinyl pyrrollidone, hydrazides, compounds having 1 to 6 amide groups, proteins, compounds having tertiary amine and terminal amide groups, compounds having amidine groups, cycloaliphatic amine compounds and aliphatic acylureas. Suitable scission inhibitors as well as suitable antioxidants and proportions are disclosed in application Ser. No. 826,115 filed by Dolce on July 10, 1959, now U.S. Patent 3,152,101, application Ser. No. 831,720, filed by Dolce, Berardinelli and Hudgin on Aug. 5, 1959, now U.S. Patent 3,144,431, application Ser. No. 838,427, filed by Berardinelli on Sept. 8, 1959, now abandoned, application Ser. No. 838,832, filed by Dolce and Hudgin on Sept. 9, 1959, now U.S. Patent 3,200,090, application Ser. No. 841,690, filed by Kray and Dolce on Sept. 23, 1959, now abandoned, application Ser. No. 851,560, filed by Berardinelli, Kray and Dolce on Nov. 9, 1959, now abandoned, application Ser. No. 1,457, filed by Dolce and Berardinelli on Jan. 11, 1960, now U.S. Patent 3,133,896 and application Ser. No. 4,881, filed by Kray and Dolce on Jan. 27, 1960 now U.S. Patent 3,156,669. The disclosures of the above mentioned applications are incorporated herein by reference.

The stabilizers may be incorporated into the polymer by dissolving both the polymer and the stabilizer in a common solvent and thereafter evaporating the solution to dryness. Alternatively, the stabilizers may be incorporated into the polymer by applying a solution of the stabilizer to finely divided polymer, as in a slurry, and thereafter filtering the polymer and evaporating to dryness. The stabilizer, in finely divided dry state may be blended into finely divided polymer in any suitable blending apparatus.

One suitable method of incorporation of the chemical stabilizers is by blending a dry solid stabilizer into the plastic polymer, while the latter is being kneaded as on heated rolls or through an extruder.

Since the stabilizers are generally normally solid materials, it is important, for the purpose of this invention, that they be very finely divided in the final blend for melt spinning. Larger particles of stabilizer may clog the orifices of the spinning jet or may constitute a substantial portion of the cross section at a particular portion of the fiber. The maximum particle size of stabilizer which may be tolerated depends upon the size of the spinning orifices and the denier of the final filament, but in general the stabilizer particles should be smaller than 125 microns in diameter.

The melt spinning operation is carried out in a unit which melts the solid polymer and pumps it at a constant rate and under fairly high pressure through the small holes in a spinnerette. The blend of polymer and viscosity reducing material generally has a lower melting point than that of the polymer. The spinning may be carried out at the lowered melting point or at the normal melting point using the melt of lowered viscosity. The former is preferred although both methods result in reduced polymer degradation during spinning and better fiber properties.

Oxymethylene polymers are subject to thermal degradation and some degradation takes place during melt spinning. Degradation reduces the molecular weight of the polymer and adversely affects its physical properties and degradation also produces gaseous degradation products, principally formaldehyde, which weaken the fiber and which may impede the spinning process itself. When gas bubbles form in the liquid polymer stream emerging from the spinnerette face they may be large enough so that the effective polymer area is reduced substantially and the filaments break repeatedly during the spinning operation. But even if the degree of degradation is not so high as to impede the spinning operation, it may result in a poor product because of gas bubbles and reduced polymer molecular weight.

By the process of this invention degradation during the spinning operation is minimized by operation at lower temperatures or shorter time periods or both. The blends of this invention melt at temperatures which are typically from 1° to 40° C. lower than the melting points of the polymers themselves. Operation at these temperatures reduces thermal degradation substantially. Even when spinning is carried out at or above the normal melting point of the polymers, the reduced viscosity of the blends permits the spinning to be carried out more rapidly, resulting in substantially lowered degradation.

Typical spinning temperatures may range from about 150° to 210° C. for oxymethylene homopolymers containing from 50 to 1 weight percent of viscosity reducing material and from 140° to 190° C. for copolymers containing about 25 to 0.5 mol percent of oxyethylene units and from 50 to 1 weight percent of viscosity reducing material.

The polymer blend is generally melted by subjecting chips of the blend to the action of a heated screw extruder. The chips are suitably between about 4 and 200 mesh. The melt is forced through the spinnerette orifices by a metering pump. Generally, a filter or sand pack is maintained upstream of the orifices to remove particles or gels which might block them. Preferably, the blend is maintained as a melt for not more than 600 seconds.

The spinnerette may contain from one to about 500 orifices. For most textile purposes, the orifices may be between about 5 and 25 mils in diameter. Monofilaments, for special uses such as tow rope, may be extruded through orifices up to 100 mils in diameter. The liquid streams emerge from the orifices, generally downwardly, into a gaseous medium, which may be air or an inert gas and solidify. The filaments are taken up at a velocity between about 1 and 50 feet per second. During extrusion and solidification, all or most of the viscosity reducing agent is generally volatilized from the polymer streams. Where desired, a relatively non-volatile viscosity reducing agent may be used so that the fiber contains a residual amount thereof.

In order to improve the physical properties of the filaments they are drawn after melt extrusion to orient the polymer molecules. Oxymethylene polymer filaments are preferably drawn to about 3 to 20 times their original length at a temperature between about 60° and 160° C. Particularly good results are obtained by a two-stage draw wherein the filaments are drawn to about 3 to 15 times their original length in a first stage at a temperature between about 60° to 160° C. and then to about 1.05 to 6 times their drawn length in a second stage at 100° to 160° C. The drawn filaments may then be wound up on bobbins or cut into staple fiber of any desired length.

A fiber produced in accordance with the preferred aspect of this invention, after being drawn as described above generally has a tenacity in excess of 5 g./denier and usually between 7 and 14 g./denier, a modulus between 50 and 165 g./denier and an elongation of 10 to 40%.

The fiber may be used for the production of textile materials by weaving or knitting as well as for the production of hosiery, carpeting and bedding material.

EXAMPLE I

An oxymethylene polymer resin containing 96.2 weight percent of monomeric units derived from trioxane and 3.8 weight percent of monomeric units derived from 1,3-dioxolane was mixed with 30% of its weight of dimethyl formamide. The resin contained one weight percent each of malonamide and 2,2'-methylene-bis (4-methyl-6-tertiary butyl phenol) as stabilizers. The polymer had an inherent viscosity of 1.22 dl./g. at 0.1 weight percent in p-chlorophenol, containing 2 weight percent of $\alpha$- pinene and a degradation rate of 0.05 weight percent lost per minute when maintained at 222° C. in an open vessel in a circulating air oven. The polymer was in the form of ground chips having particles from 4 to 200 mesh and was admixed with the dimethyl formamide by tumbling in a tightly covered glass container.

The mixture was warmed in an oven at 60° C. for four hours and then rolled at 33 r.p.m. on a two roll rolling mill having rolls of 6" diameter and 12" in length. The temperature of one roll was maintained at 160° C. and the second roll was at 166° C. Rolling was continued for 8 minutes at which time a stringy plastic mass was obtained. The polymer was cut up and ground to pellets of 8 to 200 mesh which had a dimethyl formamide content of 3 weight percent.

The pellets were spun on a screw extruder which discharged into a spinning pack block. The screw extruder contained both a cold feed section and a heated barrel for conversion of the solid polymer to a liquid of suitable viscosity for fiber preparation. In addition the screw also developed sufficient pressure to force the liquid polymer through the filter pack which consisted of two 50-mesh screens with two 250-mesh screens alternating.

The spinneret contained 10-holes, each hole having a diameter of 20 mils.

Conversion of the polymer to fiber was accomplished at a screw barrel temperature of 175 to 180° C. with the spinneret at 175° C. The melt contained approximately 12 ml. of fluid polymer. Throughput rate of 3 ml. of fluid polymer per minute was employed giving average residence time of polymer in molten state of about 4 minutes. The take-up speed was 195.7 m./min. The yarn produced had no residual dimethyl formamide.

The yarn was drawn to 9.05 times its original length on a heated shoe using 12-inch contact length. Shoe temperature was maintained at 134° C. Draw speed of the yarn was 10.2 m./min. Under these conditions about 6000 meters of yarn were prepared which had a tenacity of 6.1 g./d. and elongation of 21.5% and denier per filament of 3.90.

A portion of the yarn so produced was given a second stage drawing using a draw ratio of 1.8 to 1 at a draw speed of 10.5 m./min. over a hot shoe. Contact length with the hot shoe was 12-inches at a shoe temperature of 137° C. 6204 meters of yarn were produced by this technique. The yarn had a tenacity of 9.9 g./d., an elongation of 13.9%, and was of 2.74 denier per fil.

EXAMPLE II

The melt spinning process of Example I was repeated using pellets of similar resin but containing no dimethyl formamide. The temperature in this case was 185–190° C. due to the higher melting point of the unblended polymer. The spinning process could not be maintained for more than about one minute because of repeated filament breaks.

It is to be understood that the foregoing detailed description is given merely by way of illustration and that many variations may be made therein without departing from the spirit of my invention.

Having described my invention what I desire to secure by Letters Patent is:

1. A polymer composition suitable for melt spinning to produce high tenacity fibers which consists essentially of an oxymethylene polymer having recurring units of the formula ($-O-CH_2-(CH_2)_n-$), wherein $n$ is an integer from zero to 2 and wherein $n$ is zero in from 75 to 99.5% of the recurring units admixed with up to 50 weight percent of a volatile material which is miscible with a melt of said polymer at its melting temperature and which reduces the viscosity of such a melt at least 20 percent, said material selected from the group consisting of formamides, phenols, halogen-substituted aliphatic hydrocarbons, lactones, aromatic amines and aryl phosphates.

2. An oxymethylene polymer fiber produced from the composition of claim 1, having a tenacity in excess of 5 g./denier, said fiber produced by extruding through a spinning orifice a molten mixture comprising the composition of claim 1, solidifying the molten mixture as a stream after said extrusion to form a filament thereof and drawing said filament to between 3 and 20 times its original length while maintaining its temperature between about 60° and 160° C.

References Cited

UNITED STATES PATENTS

| 2,768,994 | 10/1956 | MacDonald. | |
| 2,844,561 | 7/1958 | Bechtold et al. | |
| 2,871,220 | 1/1959 | MacDonald. | |
| 3,347,969 | 10/1967 | Moelter | 264—210 |
| 2,214,442 | 9/1940 | Spanagel | 264—211 |
| 2,824,780 | 2/1958 | Satterthwaite | 264—211 |

OTHER REFERENCES

Polymers and Resins, Golding, Van Nostrand, publishers, 1950, pp. 549, 558–561.

Journal of Applied Polymer Science, vol. 1, issue No. 2., Alsup et al. Mar.-Apr. 1959, pp. 185–191.

WILLIAM H. SHORT, Primary Examiner

L. M. PHYNES, Assistant Examiner

U.S. Cl. X.R.

260—30.6, 32.6, 33.4, 33.8, 45.9, 45.95, 67; 264—210